US 12,446,190 B2

(12) United States Patent
Gao

(10) Patent No.: US 12,446,190 B2
(45) Date of Patent: Oct. 14, 2025

(54) SERVER RACK COOLING SYSTEM ARCHITECTURE

(71) Applicant: Baidu USA LLC, Sunnyvale, CA (US)

(72) Inventor: Tianyi Gao, San Jose, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 236 days.

(21) Appl. No.: 17/744,485

(22) Filed: May 13, 2022

(65) Prior Publication Data

US 2023/0371202 A1  Nov. 16, 2023

(51) Int. Cl.
*H05K 7/20* (2006.01)

(52) U.S. Cl.
CPC ..... *H05K 7/20327* (2013.01); *H05K 7/20818* (2013.01)

(58) Field of Classification Search
CPC ........... H05K 7/20327; H05K 7/20818; H05K 7/20809; H05K 7/208; H05K 7/20781; G06F 1/20
See application file for complete search history.

(56) References Cited

U.S. PATENT DOCUMENTS

| | | | | |
|---|---|---|---|---|
| 7,165,412 | B1 * | 1/2007 | Bean, Jr. ............ | H05K 7/20809 62/332 |
| 2008/0066889 | A1 * | 3/2008 | Knight ............... | H05K 7/20345 165/104.21 |
| 2010/0236772 | A1 * | 9/2010 | Novotny ............ | H05K 7/20836 165/287 |
| 2011/0317367 | A1 * | 12/2011 | Campbell ............. | H05K 7/203 361/700 |
| 2012/0048514 | A1 * | 3/2012 | Osbaugh ............ | H05K 7/20827 165/104.21 |
| 2012/0218711 | A1 * | 8/2012 | Kashirajima ........... | F25B 25/00 361/700 |

(Continued)

FOREIGN PATENT DOCUMENTS

TW          201344055 A     * 11/2013

OTHER PUBLICATIONS

Liu, Chung-Che "Oil-free centrifugal cooling system for data center", Nov. 11, 2013, Industrial Technology Research Institute, Description (Espacenet Machine Translation of TW 201344055 A) (Year: 2013).*

(Continued)

*Primary Examiner* — Jayprakash N Gandhi
*Assistant Examiner* — Jeffrey Francis Stoll
(74) *Attorney, Agent, or Firm* — WOMBLE BOND DICKINSON (US) LLP

(57) ABSTRACT

A cooling system for a server rack includes one or more separation containers including a first input that is fluidly connected to an external cooler to receive the fluid in the liquid form, a first output that is fluidly connected to the external cooler to provide the fluid to the external cooler in vapor form, a second one or more inputs that is fluidly connected to a respective output of a plurality of server chassis to receive the fluid in a mix of the liquid form and the vapor form, a second output that is fluidly connected to an input of an internal cooler to provide the fluid in the vapor form to the internal cooler, and a third output that is fluidly connected to the plurality of server chassis to provide the fluid in the liquid form to the plurality of server chassis.

20 Claims, 7 Drawing Sheets

(56) References Cited

U.S. PATENT DOCUMENTS

| | | | | |
|---|---|---|---|---|
| 2013/0025818 | A1* | 1/2013 | Lyon | H05K 7/20781 |
| | | | | 165/181 |
| 2013/0027883 | A1* | 1/2013 | Campbell | H05K 7/20318 |
| | | | | 165/185 |
| 2014/0124190 | A1* | 5/2014 | Campbell | H05K 7/20781 |
| | | | | 165/299 |
| 2016/0085277 | A1* | 3/2016 | Samadiani | H05K 7/20327 |
| | | | | 361/679.53 |
| 2020/0214173 | A1* | 7/2020 | Sato | H05K 7/20327 |
| 2020/0383237 | A1* | 12/2020 | Hashimoto | H05K 7/20272 |
| 2020/0404813 | A1* | 12/2020 | Gao | H05K 7/20745 |
| 2021/0084796 | A1* | 3/2021 | Gao | H05K 7/20818 |
| 2021/0153391 | A1* | 5/2021 | Gao | H05K 7/20327 |
| 2021/0185859 | A1* | 6/2021 | Gao | G06F 1/20 |
| 2021/0243917 | A1* | 8/2021 | Gao | H05K 7/20754 |
| 2021/0302088 | A1* | 9/2021 | Shao | F25B 6/02 |

OTHER PUBLICATIONS

"Vapor." Merriam-Webster.com Dictionary, Merriam-Webster, https://www.merriam-webster.com/dictionary/vapor. Accessed Oct. 9, 2024. (Year: 2024).*

"Evaporate." Merriam-Webster.com Dictionary, Merriam-Webster, https://www.merriam-webster.com/dictionary/evaporate. Accessed Oct. 9, 2024. (Year: 2024).*

* cited by examiner

SERVER RACK COOLING SYSTEM ARCHITECTURE

FIELD

Embodiments of the present disclosure relate generally to cooling systems for information technology. In particular, a cooling system for information technology may include a thermosiphon-based cooling system with a two-phase fluid that efficiently utilizes a local cooler and an external cooler for cooling the two-phase fluid.

BACKGROUND

Information Technology (IT) includes technology such as computing devices and supporting electronic components that provide functionality and services that may be made accessible through the internet or a local computer network. The computing devices may provide storage of, or access to, data, websites, computer programs, algorithms, services, and more. For example, a computing device (e.g., a server) may offer services such as email, file storage, file retrieval, support front-end websites, back-end web applications, service-to-service functionality, and more.

IT equipment such as servers and other electronic components (e.g., peripheral devices) can be assembled to a server chassis. The server chassis can include hardware that provides power, thermal management, electronic connectivity, structural support, and other considerations for IT equipment. Each server chassis can then be installed in a server rack, which may also be referred to as an IT rack. A single server chassis may include one or more server nodes, which may each include equipment that is grouped for a related purpose or function, such as performing operations for a common application.

A server node may include a printed circuit board where the electronic components are packaged. A server node may also include cooling components that are thermally coupled to the electronic components, such as a cold plate, or other cooling hardware.

As such, one or more server nodes may be populated to a server chassis, and one or more server chassis may be populated to a server rack. The server rack may include electrical infrastructure to power the various server nodes in each server chassis. The server rack may include mechanical infrastructure such as a frame, rales, guides, brackets, plates, mounting hardware, and more. Importantly, the server rack may include thermal management infrastructure to support cooling of each of the server nodes housed within each server chassis.

As the number and complexity of computing services continues to grow, so does the popularity grow for high power servers. High power servers, such as servers that perform artificial-intelligence based operations, cyber-security algorithms, or blockchain technology, may generate large amounts of thermal energy. This trend inevitably leads to thermal challenges and other related issues.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect. It should be understood that some of the embodiments shown may be combined with other embodiments even if not shown as such in each figure.

DETAILED DESCRIPTION

Figure 1:
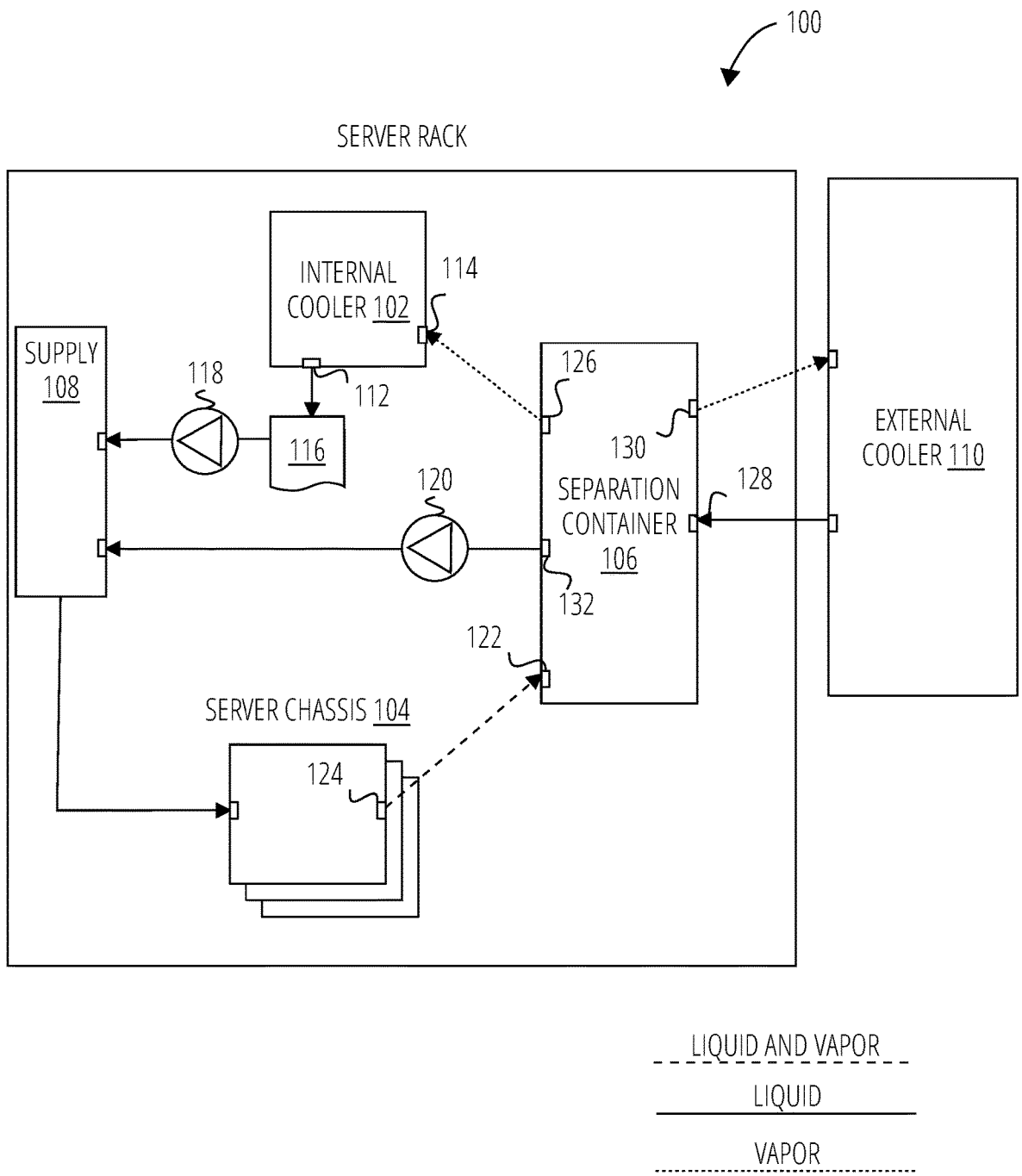
FIG. 1 shows an example of a cooling system for a server rack in accordance with some embodiments.

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Two-phase cooling systems circulate a two-phase fluid that absorbs heat and stores it in the form of latent thermal energy by utilizing a phase change process of the fluid. A thermosiphon device is a passively driven thermal management device that utilizes the inherent motive forces of natural convection and conduction. Convection can be understood as the movement caused within a fluid by the tendency of hotter and therefore less dense material to rise (e.g., vapor), and colder, denser material (e.g., liquid) to sink under the influence of gravity, which consequently results in transfer of heat. Conduction may be understood as the natural tendency of thermal energy to move from one medium to another to reduce a different in thermal energy between the mediums. A thermosiphon device uses these passive forces to promote fluid circulation from areas of high heat to low heat and back.

It may be desirable to integrate a server rack with a two-phase fluid and thermosiphon based cooling system, however, issues may arise related to maintaining and managing the flow of the two-phase fluid throughout a server rack under varying thermal loads, in an efficient and robust manner. As such, a solution is desired to address some of the issues and complexities.

Embodiments of the present disclosure can address issues related to using a thermosiphon-based two-phase fluid solution in a server rack. In a two-phase cooling system, a two-phase fluid may be circulated to one or more heat generation locations in liquid form, such as, for example, a cold plate of a server chassis. At those locations, the fluid absorbs thermal energy which causes the fluid to undergo phase change from liquid phase to vapor phase. This process absorbs the heat which is contained in the form of latent thermal energy. The vapor must then be circulated out of the 'hot' location and then cooled back to liquid so that it may eventually be circulated back to the 'hot' locations. Different server racks may have different thermal loads. Further, thermal loads may vary dynamically (e.g., from one moment to another).

In particular, there is a need for an architecture within a server rack that promotes efficient separation of liquid and vapor forms of the two-phase fluid. Further, there is a need for a server rack that efficiently supplies and gathers the two-phase fluid to and from server nodes within the server rack for dynamically varying thermal loads. Further, there is a need to provide redundancy in fluid supply for two-phase fluid systems in an IT environment. A cooling system may include a thermosiphon-based cooling loop that also utilizes external cooling fluid in some situations, thereby providing additional cooling capacity and redundancy.

Aspects of the present disclosure address problems and deficiencies described. A cooling system efficiently manages circulation and recirculation of two-phase fluid (which may be understood as a coolant) through high power density server electronics, and components of the cooling system. The cooling system includes unique hardware components and arrangements thereof that support the separation, cooling, circulation, and distribution with rack level two-phase fluid, in a manner that dynamically adjust to meet varying thermal needs.

In one aspect, a cooling system for a server rack comprises an internal cooler and one or more separation containers. The internal cooler includes an input to receive a fluid in vapor form and an output to deliver the fluid in liquid form to a plurality of server chassis within the server rack. The one or more separation containers include a first input that is fluidly connected to an external cooler to receive the fluid in liquid form, a first output that is fluidly connected to the external cooler to provide the fluid to the external cooler in vapor form, a second one or more inputs that is fluidly connected to a respective output of a plurality of server chassis to receive the fluid in a mix of the liquid form and the vapor form, a second output that is fluidly connected to the input of the internal cooler to provide the fluid in the vapor form to the internal cooler, and a third output that is fluidly connected to the plurality of server chassis to provide the fluid in the liquid form to the plurality of server chassis. The external cooler may be understood as an external cooling system that includes a chiller, fans, or a liquid cooling loop to cool the fluid external to the server rack.

In some embodiments, the cooling system may include one or more pumps that are arranged in the fluid lines that carry the fluid between the components (e.g., the plurality of server chassis, the one or more separation containers, and the internal cooler), to increase flow of the fluid through the plurality of server chassis.

In some embodiments, the one or more separation containers include a first separation container and a second separation container. The first separation container includes the second one or more inputs that receives the fluid directly from the plurality of server chassis, and a third input that receives the fluid in the liquid form directly from the output of the internal cooler. The second separation container includes the first input that is fluidly connected to receive the fluid from the external cooler and a fluid line arranged to receive the fluid from the first separation container.

In some embodiments, the one or more separation containers comprise a first separation container and a second separation container. The first separation container includes fluid lines arranged to receive the fluid through the second one or more inputs directly from the plurality of server chassis, and to receive the fluid directly from the output of the liquid cooler, and a pump arranged in the fluid lines to increase flow of the fluid in the fluid lines to the second separation container. The second separation container includes the first input that is fluidly connected to receive the fluid (e.g., in liquid form) from the external cooler and the first output that provides the fluid to the external cooler.

In some embodiments, the one or more separation containers comprises a first separation container and a second separation container. The first separation container includes fluid lines arranged to receive the fluid through the second one or more inputs directly from the plurality of server chassis. The second separation container includes the first input that is fluidly connected to receive the fluid from the external cooler, the first output that provides the fluid to the external cooler, and a fluid line connected to the output of the internal cooler.

In some embodiments, the output of the internal cooler is directly connected to respective inputs of the plurality of server chassis. The one or more separation containers comprises a first separation container and a second separation container. The first separation container includes the second one or more inputs directly from the plurality of server chassis and a fluid line with a mixed fluid pump arranged to increase flow of the fluid from the first separation container to the second separation container. The second separation container includes the first input that is fluidly connected to receive the fluid from the external cooler, and the first output that provides the fluid to the external cooler.

In some embodiments, the cooling system includes a controller, configured to control a valve that is fluidly arranged in the one or more separation containers to supply the fluid to the plurality of server chassis with the fluid within the one or more separation containers in response to a sensed level of the fluid satisfying a threshold and supply the fluid to the plurality of server chassis with the fluid from the external cooler in response to the sensed level of the fluid not satisfying the threshold.

In some embodiments, the controller is configured to control a liquid pump of the internal cooler that increases flow of a cooling liquid through the internal cooler that extracts thermal energy from the fluid in the internal cooler, in response to a sensed level of the fluid in the one or more separation containers not satisfying a threshold.

In some embodiments, the controller is configured to control a fan directed to circulate air to the internal cooler to absorb thermal energy from the fluid in the internal cooler, in response to a sensed level of the fluid in the one or more separation containers not satisfying a threshold.

In some embodiments, the controller is configured to control a third pump arranged to increase flow of the fluid from the external cooler to the one or more separation containers in response to a sensed level of the fluid in the one or more separation containers not satisfying a threshold.

FIG. 1 shows an example cooling system 100 for a server rack in accordance with some embodiments. Cooling system 100 shows an example representation that encompasses examples shown in other figures or discussed in other sections.

In some aspects, a cooling system 100 for a server rack includes an internal cooler 102 having an input 114 to receive a two-phase fluid in vapor form and an output 112 to deliver the two-phase fluid in liquid form to a plurality of server chassis within the server rack. It should be understood that fluid and two-phase fluid may be used interchangeably within the context of the fluid loop through the plurality of server chassis within the server rack. The fluid may be carried directly or indirectly from the internal cooler 102 to the plurality of server chassis 104, which may be aided with one or more pumps.

A block 116 is shown to indicate both direct and indirect path of the fluid from the internal cooler 102 to the plurality of server chassis 104. In some examples, as described in other sections, the internal cooler 102 may directly connect to a supply manifold 108 which distributes the fluid (in liquid form) to each of the plurality of server chassis 104. In other examples, as described in other sections, the output 112 of the internal cooler 102 may connect to one or more separation containers 106 which then distributes the fluid to supply manifold 108 which carries the fluid to each of the plurality of sever chassis 104.

A server rack may have a plurality of server chassis 104 installed upon it. Each of the server chassis may have one or more server nodes that may include electronic components such as a processor, memory, etc. The thermal load created by the electronic components may vary depending on the tasks being performed by the server. Each server chassis may include a cooling system such as a cold plate that is thermally coupled to electronic components of the respective server chassis. The two-phase fluid may travel through the cold plate and absorb latent thermal energy which converts at least some of the fluid to vapor.

The cooling system 100 includes one or more separation containers 130. As the fluid leaves the cold plate and server chassis and circulates to the one or more separation containers 130, the fluid may include a mixture of vapor and liquid. The one or more separation containers receive the fluid (in mixed vapor and liquid form) from the plurality of server chassis 104 and separate the fluid into vapor and liquid components. The liquid portion of the fluid may be housed within the one or more separation containers and recirculated to the plurality of server chassis. The vapor may be distributed to the internal cooler 102 to be condensed back to liquid form. The separation container may also distribute some of the vapor to external cooler 110. As such, a thermosiphon-based loop may include two overlapping loops: the path of the fluid from the internal cooler 102 to the server chassis, through the one or more separation containers 106, and back to the internal cooler 102; as well as the path of the fluid from the external cooler 110, to the one or more separation containers 106, to the server chassis 104, back to the one or more separation containers 106, and back to the external cooler 102. The separation container may receive fluid, when needed, from external cooler 110. In some aspects, the separation container 106 receives fluid from external cooler 110 in response to one or more criteria. In some aspects, the separation container 106 does not receive fluid from external cooler 110 when the one or more criteria are not satisfied, as described in other sections. As such, the thermosiphon-based loop with the external cooler 110 may be utilized as a supplement to the loop with the internal cooler 102, when the thermal load of the server chassis increases.

The one or more separation container 130 may include a first input 128 that is fluidly connected to an external cooler 110 to receive the fluid in liquid form. The one or more separation container 130 may include a first output 130 that is fluidly connected to the external cooler 110 to provide the fluid to the external cooler 110 in vapor form. The one or more separation container 130 may include a second one or more inputs 122 that is fluidly connected to a respective output 124 of a plurality of server chassis to receive the fluid in a mix of the liquid form and the vapor form. The one or more separation containers 106 may include a second output 126 that is fluidly connected to the input of 114 of the internal cooler 102 to provide the fluid in the vapor form to the internal cooler 102. The one or more separation container 130 may include a third output 132 that is fluidly connected to the plurality of server chassis 104 to provide the fluid in the liquid form to the plurality of server chassis.

The cooling system 100 may include one or more pumps such as pump 118 and pump 120 that are arranged in the fluid lines that carry the fluid between the components, to increase flow of the fluid through the plurality of server chassis. The one or more pumps may be arranged in the one or more fluid lines as shown in FIG. 1, or in other locations. In some examples, the pumps may be activated in response to when the amount of fluid detected within the one or more separation containers 106 is below a threshold amount, as described in other sections.

External cooler 110 may be understood as a cooling system that is external to a server rack. In some embodiments, the external cooler 110 may be fluidly connected to two or more server racks. The external cooler 110 may include a fan, a fluid cooling loop (separate from the two-phase fluid loop of the server rack), refrigeration, or other cooling systems. The external cooler 110 may include sensors such as pressure sensors, fluid level sensors, and temperature sensors, to manage the supply and temperature of the two-phase fluid.

Figure 2:
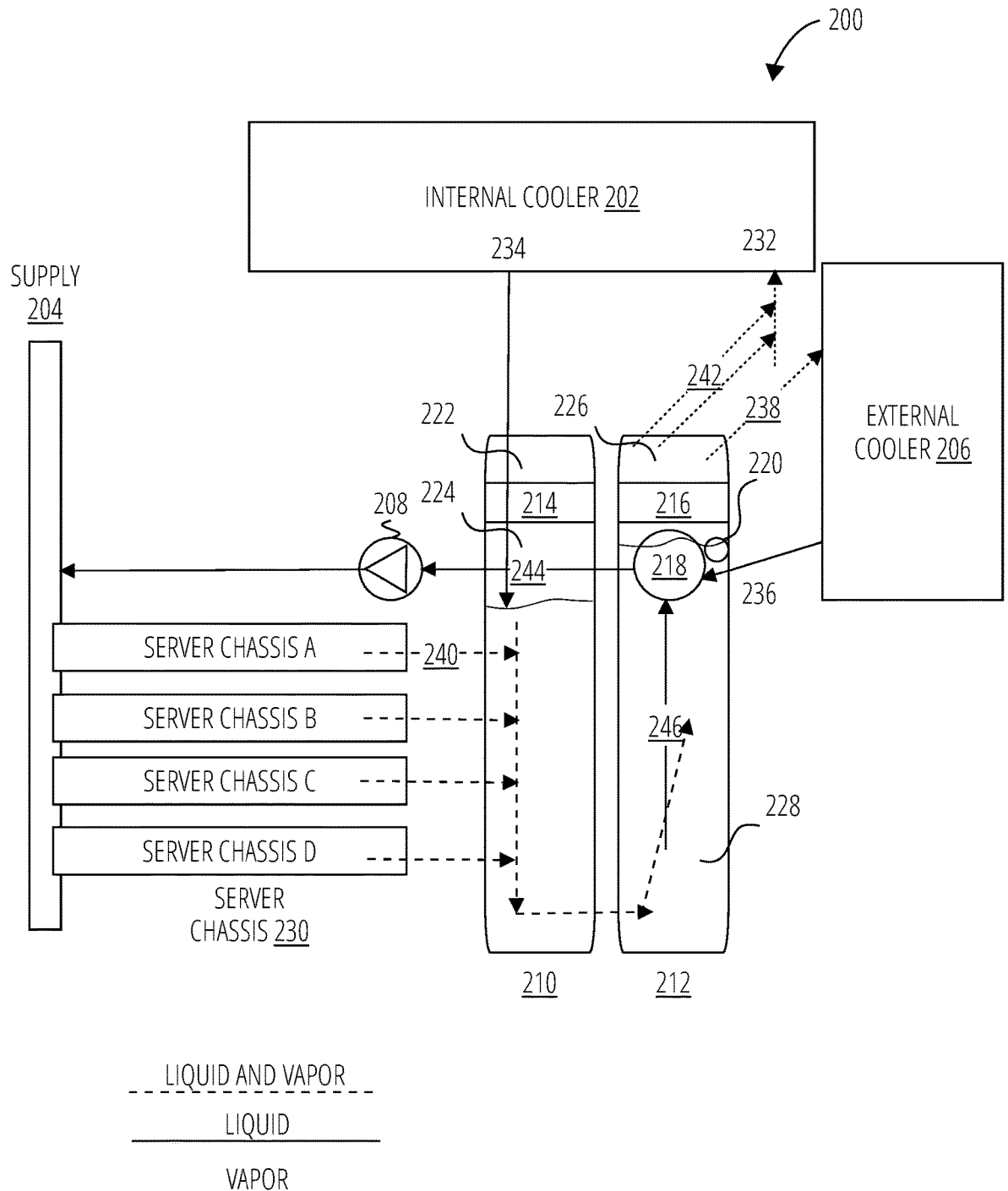
FIG. 2 illustrates an example of a cooling system with two-phase fluid using the one or more separation containers in the return and supply of the thermosiphon-based loop.

FIG. 2 illustrates an example of a cooling system 200 with two-phase fluid using the one or more separation containers in the return and supply of the thermosiphon-based loop, in accordance with some embodiments. The cooling system 200 includes the thermosiphon liquid return from internal cooler 202 being fluidly connected to a first container 210 of the one or more separation containers. A second container 212 of the one or more separation containers receives the two-phase fluid from an external cooler 206. The first container 210 has fluid lines that direct the fluid (having a mix of vapor and liquid) to the second container 212 where separation of the fluid is promoted. The fluid in vapor form may be directed from the second container directly to internal cooler 202 as part of the thermosiphon loop. The fluid in vapor form may also be directed to external cooler 206.

The liquid fluid source may be managed by a valve 218 which may be a three-way valve. The first container 210 receives the two-phase fluid in mixed form directly from the plurality of server chassis 230. Further, the two-phase fluid is received directly from internal cooler 202 in liquid form directly. The two-phase fluid from the plurality of server chassis 230 and from the internal cooler 202 is directed from the first container 210 to the second container 212. In the second container 212, fluid separation is promoted. Gravity may act on the fluid within the second container 212 to separate the fluid to vapor and liquid. Further, a liquid barrier 216 may promote further separation of the fluid, as described in other sections.

The fluid (in liquid form) is pumped (e.g., with pump 208) to a supply manifold 204 that supplies each of the plurality of server chassis 230 with the fluid (in liquid form). Management of the pumps and the valve 218 may be performed in various manners to promote efficient use of the two-phase fluid under different loads. In some cases, the management of the pumps and valve may be performed with a controller based on one or more fluid levels, as described in other sections.

The cooling system 200 may include an internal cooler 202 and one or more separation containers (210 and 212). The internal cooler 202 includes an input 232 to receive a fluid in vapor form and an output 234 to deliver the fluid in liquid form to a plurality of server chassis 232 (e.g., server chassis A, B, C and D) within the server rack.

Separation container 212 may include a first input 236 that is fluidly connected to an external cooler 206 to receive the fluid in liquid form. The first input 236 may be fluidly arranged to receive the fluid directly to container 212. In some examples, the first input 236 may receive the fluid from the external cooler 206 directly to the three-way valve 218.

The separation container 212 may include a first output 238 that is fluidly connected to the external cooler 206 to provide the fluid to the external cooler 206 in vapor form. The separation container 210 may include a second one or more inputs 240 that is fluidly connected to a respective output of a plurality of server chassis 230 (e.g., from each of server chassis A, B, C, and D) to receive the fluid in a mix of the liquid form and the vapor form. The separation container 212 may include a second output 242 that is fluidly connected to the input 232 of the internal cooler 202 to provide the fluid in the vapor form to the internal cooler, and a third output 244 that is fluidly connected to the plurality of server chassis 230 (e.g., through fluid supply manifold 204) to provide the fluid in the liquid form to the plurality of server chassis 230. The external cooler 206 may be understood as an external cooling system that includes a chiller, fans, or a liquid cooling loop to cool the fluid external to the server rack.

In some embodiments, each of the one or more separation containers 210 and 212 may have respective interior portion that may house the two-phase fluid (e.g., in liquid, vapor, or a mix). Further, each may include a liquid barrier 214 and 216 (respectively) housed within the interior of the respective container. For example, liquid barrier 216 may divide the interior portion of separation container 212 into a top portion 226 that holds the fluid in vapor form, and a bottom portion 228 that may hold the fluid in liquid form and vapor form. Similarly, liquid barrier 214 may be disposed within separation container 210 so that a top portion 222 contains vapor and a bottom portion 224 hold liquid and vapor.

A liquid barrier may promote separation of the two-phase fluid. The outputs 242 and 238 may be located in portion 226 of separation container 212, so that the fluid that enters the internal cooler 202 and external cooler 206 contains primarily vapor, for improved efficiency of the coolers. Outputs 242 and 238 may be understood as risers that may be angled vertically to promote the travel of vapor upward to the internal cooler 202 and external cooler 206. The liquid barriers may be understood as a mist extractor that has a decreased vapor resistance, an increased liquid resistance, or both. In some embodiments, the liquid barrier may include a plate with perforations. In some embodiments, the liquid barrier may include a screen or filter with small openings. Due to the structure and geometry of the liquid barrier, vapor has an easier time passing through the liquid barrier than liquid, thereby promoting separation of the fluid to reduce the amount of liquid that enters internal cooler 202 and external cooler 206.

The three-way valve 218 may be housed in the second separation container 212. The valve may receive input 236 from external cooler 206, or input 246 that receives fluid (in liquid form) from the interior of the separation container 212, and direct either one of the inputs to output 244. As such, the state of the three-way valve 218 may use the fluid from the external cooler 206 or from the interior of the separation container 212 and direct that fluid to the server chassis 230 (e.g., through supply manifold 204). In some aspects, pump 208 may be fluidly arranged in the fluid line at output 244, to increase flow of the two-phase fluid (in liquid form) to the server chassis 230.

One or more fluid sensors 220 may be arranged to sense the fluid within separation container 212. The sensors may detect the amount (e.g., a level) of fluid that is present within the separation container. The three-way valve and the pump may be operated in view of the sensed fluid amount, e.g., ('off' when a threshold is satisfied, 'on' when below the threshold).

Figure 3:
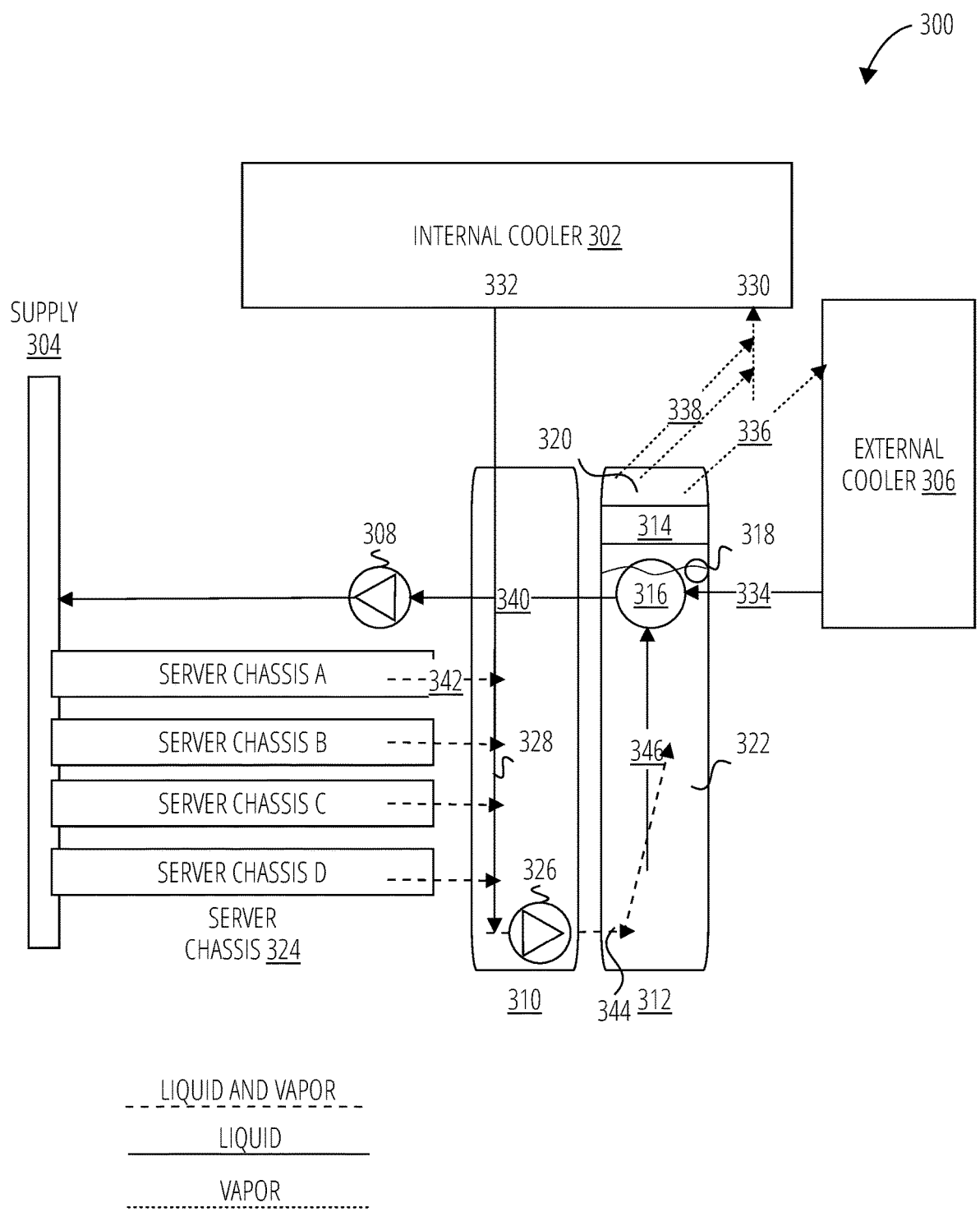
FIG. 3 illustrates an example of a cooling system with two-phase fluid using a fixed fluid loop with one or more separation containers of a thermosiphon-based loop.

FIG. 3 illustrates an example of a cooling system 300 with two-phase fluid using a fixed fluid loop with one or more separation containers of a thermosiphon-based loop. The cooling system 300 may include one or more separation containers 310 and 312. A first separation container 310 may include a fixed fluid loop 328. The fixed fluid loop 328 may include fluid lines which may be interconnected to receive the two-phase fluid from the plurality of server chassis 324. The fluid lines of the fixed fluid loop 328 may also receive fluid (in liquid form) directly from internal cooler 302, which may be understood as a liquid return from a thermosiphon-based loop. The fluid lines of the fixed fluid loop 328 may be connected to a pump 326 to pump the fluid within the fixed fluid loop 328 to a second separation container 312.

The second separation container 312 separates the fluid into vapor and liquid. The liquid is directed to the plurality of server chassis 324, and the vapor is directed to internal cooler 302 or external cooler 306 or both. The fluid (in liquid form) may be directed to the plurality of server chassis 324 through a three-way valve 316 which may select which fluid source (e.g., from the external cooler 306 or from within the second separation container 312) to supply the server chassis with.

For example, cooling system 300 may include internal cooler 302 having an input 330 to receive a fluid in vapor form and an output 332 to deliver the fluid in liquid form to a plurality of server chassis 324 within the server rack. Although not shown, it should be understood that internal cooler 302 may include one or more channels that the two-phase fluid flows through. In some embodiments, the internal cooler 302 may include a fan that is directed to transfer thermal energy from the two-phase fluid, e.g., by blowing air through a cold plate and/or heatsink. In some embodiments, the internal cooler 302 may include a liquid cooling loop that carries a single-phase coolant that is fluidly isolated from the two-phase fluid loop.

One or more separation containers 310 and 312 may include a first separation container 310 and a second separation container 312. The second separation container 312 may include a first input 334 that is fluidly connected to an external cooler 306 to receive the fluid in liquid form. This first input 334 may be fluidly connected to a valve 316 which may include a three-way valve. The second separation container 312 may further include a first output 336 that is fluidly connected to the external cooler 306 to provide the fluid to the external cooler in vapor form. Second separation container 312 may further include a second output 338 that is fluidly connected to the input 330 of the internal cooler 302 to provide the fluid in the vapor form to the internal cooler 302. In some examples, the second separation container 312 includes a third output 340 that is fluidly connected to the plurality of server chassis 324 (e.g., through a supply manifold 304) to provide the fluid in the liquid form to the plurality of server chassis. The three-way valve 316 may have two states, a first state that fluidly connects fluid line 346 to output 340, and a second state that fluidly connects fluid input 334 to output 340.

The first separation container 310 may include a second one or more inputs 342 from each of the server chassis that is fluidly connected to a respective output of a plurality of server chassis 324 to receive the fluid in a mix of the liquid form and the vapor form. The second one or more inputs 342 may be directly received by the first separation container 310 through fixed fluid lines 328. Fluid lines as described here and in other examples may include rigid or flexible conduit which may be interconnected using various fluid carrying hardware (e.g., valves, joints, connectors, etc.). The first separation container 310 may include a third input as part of fluid lines 328 that receives the fluid in the liquid form directly from the output 332 of the internal cooler.

The second separation container includes a fluid line 344 arranged to receive the fluid (which may include a mix of liquid and vapor) from the first separation container. In some aspects, a first pump 308 is arranged in output 340 to increase flow of fluid from the second separation container to the server chassis 324. In some aspects, a second pump 326 is arranged to increase fluid flow from the first separation container 310 (e.g., fluid lines 328) to the second separation container 312. The second pump 326 may be a mixed fluid pump that pumps the fluid in vapor and liquid form.

Second separation container 312 may include a liquid barrier 314 that promotes separation of the fluid and separates the second separation container into a top portion 320 that is above the liquid barrier 314, and a bottom portion 322 that is below the liquid barrier 314. Outputs 338 and 336 may be arranged in the top portion 320. Further, three-way valve 316 may receive the two-phase fluid in liquid form from the bottom portion 322 of the second separation container 312. The three-way valve 316 may be controlled to direct fluid from external cooler 306 to the server chassis 324, or from the fluid within the second container 312 to the server chassis 324. The control of valve 316, pumps (e.g., 308 and 326) as well as cooling effort of the internal cooler 302, may be performed based on readings of one or more sensors 318 of the second separation container 312. The sensors 318 may detect the amount or level of fluid, or other sensed value from which the amount of fluid within the second separation container 312 may be derived from.

Figure 4:
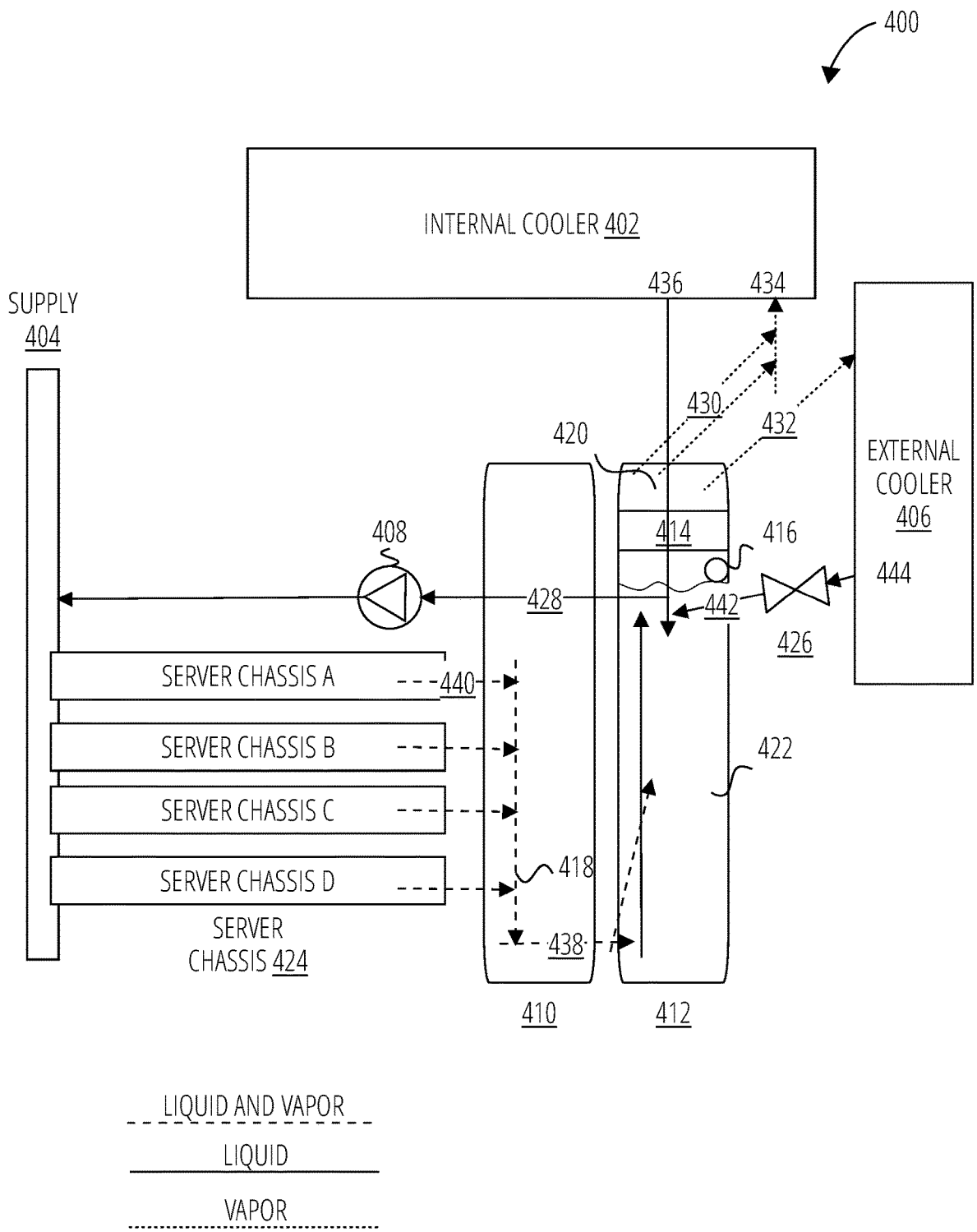
FIG. 4 illustrates an example of a cooling system with fixed fluid loop in a first separation container and an internal cooler output to a second separation container, in accordance with some embodiments.

FIG. 4 illustrates an example of a cooling system 400 with fixed fluid loop in a first separation container and an internal cooler output to a second separation container, in accordance with some embodiments.

Similar to other examples, cooling system 400 includes internal cooler 402 having an input 434 to receive fluid in vapor form and an output 436 to deliver the fluid in liquid form to a plurality of server chassis 424 within the server rack. One or more separation containers include a first separation container 410 and a second separation container 412.

As shown, the second separation container 412 includes a first input 442 that is fluidly connected to an output 444 of external cooler 406 to receive the fluid in liquid form from the external cooler 406. The second separation container 412 includes a first output 432 that is fluidly connected to the external cooler 406 to provide the fluid to the external cooler in vapor form. A controllable valve 426 may be arranged to control the flow of fluid from the output 444 of the external cooler 406 to the input 442 of the second separation container 412. The valve 426 may be controlled to open or close based on the amount of fluid in the second separation container 412, as described in other sections.

The second separation container 412 includes a second output 430 that is fluidly connected to the input 434 of the internal cooler 402 to provide the fluid, in vapor form, to the internal cooler 402. The second separation container includes a third output 428 that is fluidly connected to the plurality of server chassis (e.g., through a supply manifold 404) to provide the fluid, in the form, to the plurality of server chassis 424.

The first separation container 410 may include fluid lines 418 which may be fixed fluid lines (e.g., sealed and interconnected fluid lines). The fluid lines 148 may receive a second one or more inputs 440 that may be fluidly connected to a respective output of a plurality of server chassis 424 to receive the fluid in a mix of the liquid form and the vapor form from the plurality of server chassis 424. The fluid lines 418 may be arranged to receive the fluid through the second one or more inputs 440 directly from the plurality of server chassis 424. In this example, as well as others, the first separation container has a fluid line 438 (e.g., an output) that directs the fluid from the first separation container 410 to the second separation container 412. Fluid line 438 may be fluidly connected to fixed fluid lines 418. Because the fluid into the first separation container 410 is contained and carried in the fluid lines 418, fluid may not collect in the interior of the first separation container 410. The first separation container 410 may, however, serve as a failsafe to catch fluid that may inadvertently leak from the fluid lines 418.

Second separation container 412 may include a liquid barrier 414 which may include characteristics described on other sections. The liquid barrier 414 may separate the second separation container into a top region 420 and a bottom region 422. The top region may hold the fluid in vapor form and not liquid, due to the separation of the fluid from gravity and from the liquid barrier. The outputs 430 and 432 from the second separation container 412 may be located within the top region, to take the vapor (and not liquid) from the second separation container to the internal cooler 402 and external cooler 406.

In some examples, the one or more separation containers (e.g., the first separation container 410 and the second separation container 412) do not have a liquid barrier 414. It may be optional. Gravity and the geometry of the one or more separation containers may be sufficient to promote the separation of the fluid into vapor and liquid.

A pump 408 may be arranged within the output 428 of the second separation container 412 to the supply manifold 404 of the server chassis 424 to draw the fluid (in liquid form) from within the second separation container 412 through each of the server chassis 424. The pump 408 may be controlled in view of readings from one or more sensors 416 which may indicate the amount of fluid within the second separation container 412.

With this architecture, output 436 of the internal cooler 402, which may be understood as the thermosiphon loop liquid return, is fluidly connected directly to the second separation container 412 which is also fluidly connected to collect the two-phase fluid from the plurality of server chassis 424, the internal cooler 402, and external cooler 406. Further, the output 436 of the internal cooler 402 is fluidly connected directly to the interior of the second separation container 412 and the output 444 of the external cooler 406 is fluidly connected to deposit the two-phase fluid to the interior of the second separation container 412. Thus, the second separation container 412 collects the fluid from the server chassis, the internal cooler, and the external cooler while maintaining separation of the fluid into vapor (in the top region 420) and liquid (in the bottom region 422). The second separation container 428 outputs the fluid (in liquid form) to the server chassis 424.

Figure 5:
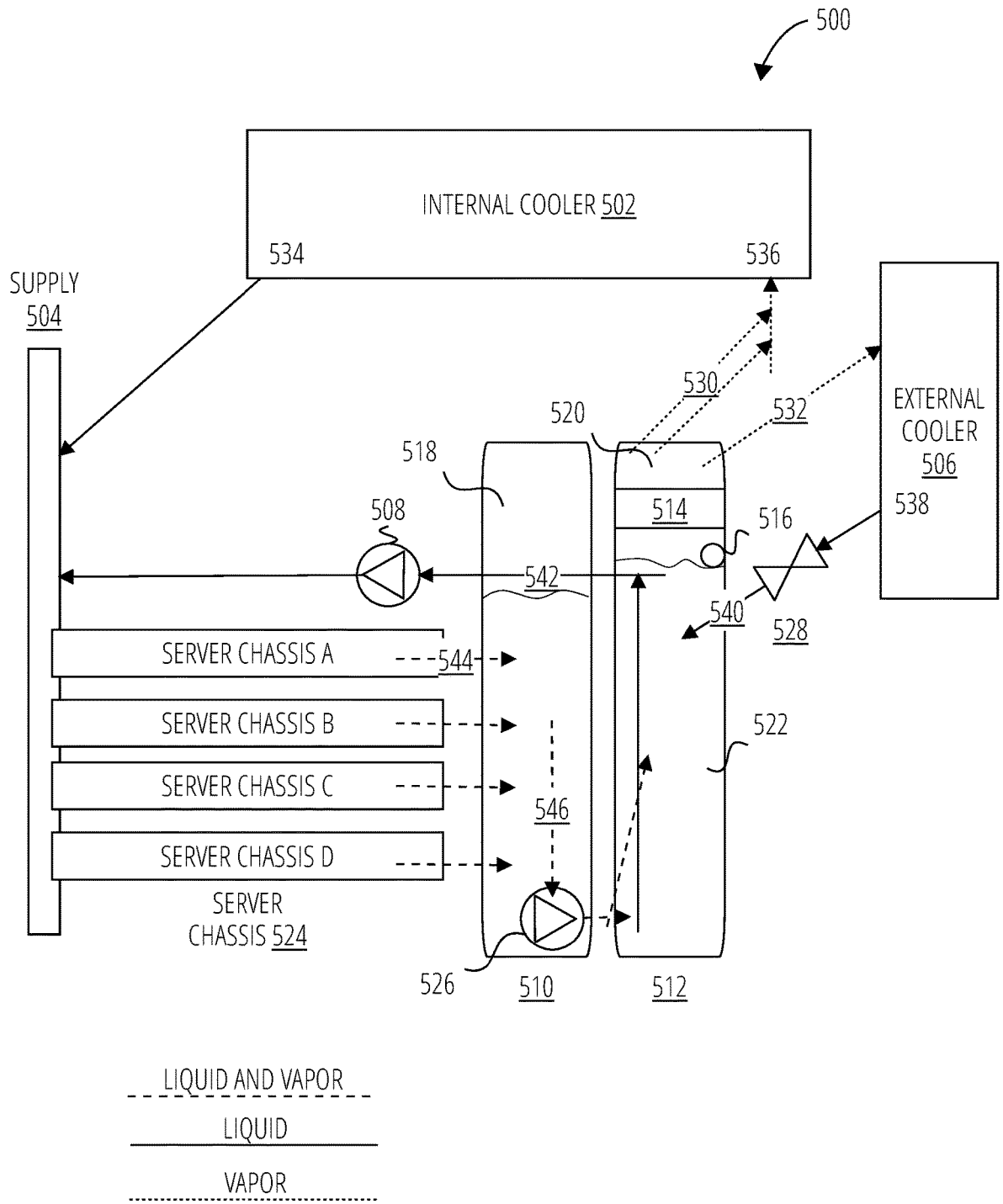
FIG. 5 illustrates an example of a cooling system with a mixed fluid pump, in accordance with some embodiments.

FIG. 5 illustrates an example of a cooling system 500 with a mixed fluid pump 526, in accordance with some embodiments.

Similar to other examples, cooling system 500 includes internal cooler 502 having an input 536 to receive the fluid in vapor form and output 534 to deliver the fluid in liquid form to a plurality of server chassis 524 within the server rack. One or more separation containers include a first separation container 510 and a second separation container 512.

The second separation container 512 includes a first input 442 that is fluidly connected to an output 538 of external cooler 506 to receive the fluid in liquid form from the external cooler 506. The second separation container 512 includes a first output 532 that is fluidly connected to the external cooler 506 to provide the fluid to the external cooler 506 in vapor form.

A controllable valve 528 may be arranged to control the flow of fluid from the output 538 of the external cooler 506 to the input 540 of the second separation container 512. The valve 528 may be controlled to open or close based on the amount of fluid in the second separation container 512, which may be sensed through one or more sensors 516, as described in other sections.

The second separation container 512 includes a second output 530 that is fluidly connected to the input 536 of the internal cooler 502 to provide the fluid in the vapor form to the internal cooler 502. The second separation container 512 includes a third output 542 that is fluidly connected to the plurality of server chassis (e.g., through a supply manifold 504) to provide the fluid in the liquid form to the plurality of server chassis 524.

Second separation container may include a liquid barrier 514 which may include characteristics described on other sections. The liquid barrier 514 may separate the second separation container into a top region 520 and a bottom region 522. The top region may hold the fluid in vapor form and not liquid, due to the separation of the fluid from gravity and from the liquid barrier. The outputs 530 and 532 from the second separation container 512 may be located within the top region, to take the vapor (and not liquid) from the second separation container to the internal cooler 502 and external cooler 506.

In this example, the output 534 of the internal cooler 502 is directly connected to respective inputs of the plurality of server chassis (e.g., through supply manifold 504). The first separation container 510 includes the second one or more inputs 544 directly from the plurality of server chassis 524 and a fluid line 546 with a mixed fluid pump 526 arranged to increase flow of the fluid from the first separation container 510 to the second separation container 512. The mixed fluid may be collected from the server chassis 524 and contained within the interior 518 of the first separation container 510. The mixed fluid pump 526 may pump the mixed fluid from first separation container 510 to the second separation container 512.

The second separation container 512 includes the first input 540 that is fluidly connected to receive the fluid from the external cooler 506. The second separation container 512 includes the first output 532 that provides the fluid to the external cooler 506. A pump 508 may be arranged at output 542 to draw the fluid (in liquid form) from the second separation container 512 to the server chassis 524. As discussed, operation of the pumps and valves may be performed based on the amount of fluid present in the separation containers, which may be sensed by one or more sensors 516.

With such an architecture, the mixed fluid pump 526 may be fluidly arranged within the mixed fluid loop 546 to draw fluid (as a mix of vapor and liquid) from within the first separation container 510 to collect and separate in the second separation container 512. Separation container 512 may separate the fluid and direct some of the vapor to the internal cooler 502, and some of the vapor to external cooler 506. The liquid output of the internal cooler 502 is fluidly connected directly to the server chassis 524 (e.g., through a supply manifold 504).

Figure 6:
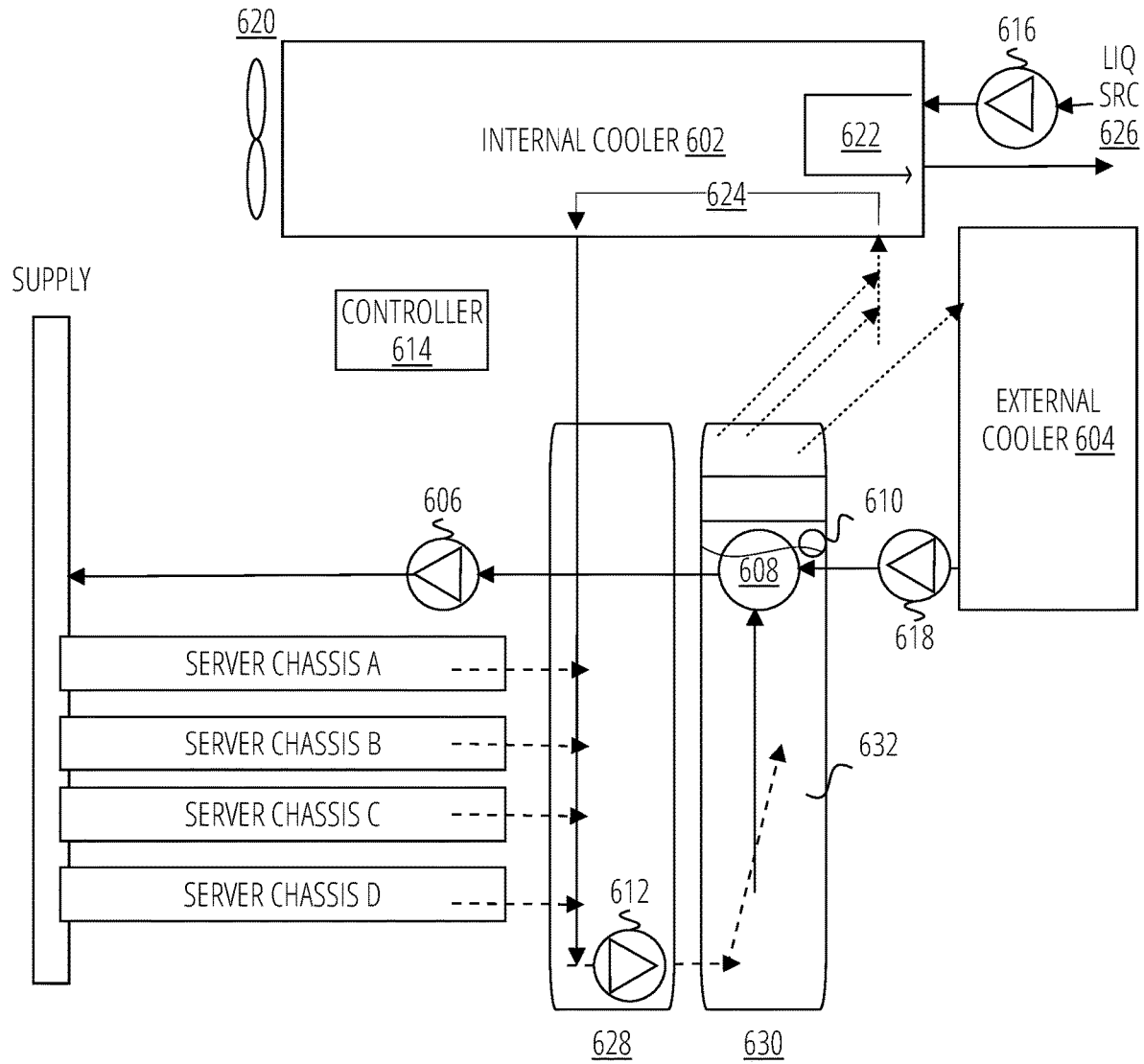
FIG. 6 shows an example of a controller for a cooling system, in accordance with some embodiments.

FIG. 6 shows an example of a controller 614 for a cooling system, in accordance with some embodiments. The controller 614 and other related features may extend to other examples. One or more fluid level sensors 610 may be disposed within a mixed fluid compartment 632 of one or more separation containers (628, 630). The controller 614 may determine the amount of fluid within the one or more separation containers (e.g., separation container 630) based on readings of the one or more sensors 610. Based on the readings, controller 614 may activate pump 612 and/or pump 606 to increase fluid flow through the components.

Controller 614 may be configured to control a valve 608 that is fluidly arranged in the one or more separation containers (e.g., separation container 630) to supply the fluid to the plurality of server chassis with the fluid within the one or more separation containers (e.g., separation container 630) in response to a sensed level of the fluid satisfying a threshold. The controller 614 causes the fluid to be supplied to the plurality of server chassis with the fluid from the external cooler 604, in response to the sensed level of the fluid not satisfying the threshold. For example, controller 614 may control valve 608 which may be three-way valve, to use only the fluid from inside the container 630 when the fluid within the container 630 is at or above a threshold level. The controller may control valve 608 to use only the fluid from the external cooler 604 when the fluid within container 630 is below the threshold.

In some aspects, controller 614 is configured to control a liquid pump 616 of the internal cooler that increases flow of a cooling liquid through the internal cooler, in response to a sensed level of the fluid in the one or more separation containers not satisfying a threshold. The cooling liquid extracts thermal energy from the two-phase fluid in the internal cooler.

For example, pump 616 may increase flow of fluid through a liquid cooling loop 622. The liquid may be a single-phase liquid coolant which may be drawn from a liquid source 626 which may be internal or external to the server rack. The liquid loop 622 may be fluidly isolated from the fluid loop 624 which contains the two-phase fluid that circulates through the server chassis. The two-phase fluid enters the internal cooler 602 as a vapor. The two-phase fluid is condensed to liquid by transferring its thermal energy to the liquid in loop 622. The two-phase fluid is returned as liquid where it is directly or indirectly provided to the plurality of server chassis. The pump 616 may be activated as needed to meet the condensing demand of the system, which may be determined based on the supply of two-phase fluid (in liquid form) as sensed by sensors 610.

Controller 614 may be configured to control a fan 620 directed to extract thermal energy from the fluid (e.g., shown as loop 624) in the internal cooler, in response to a sensed level of the fluid in the one or more separation containers not satisfying a threshold. For example, the fan 620 may be direct air flow at one or more heatsinks that absorb thermal energy from the two-phase fluid, thereby condensing the two-phase fluid from vapor to liquid.

As such, controller 614 may adjust a cooling effort of internal cooler 602 (e.g., with a fan, pump, or other technique) to dynamically meet the cooling demands of the server rack based on the amount of fluid sensed in the one or more separation containers 628 or 630.

In some embodiments, controller 614 may be configured to control a third pump 618 which may increase flow of the fluid from the external cooler 604 to the one or more separation containers, in response to a sensed level of the fluid in the one or more separation containers not satisfying a threshold. For example, pump 618 may be arranged between an output of the external cooler 604 and the three-way valve 608. The controller 614 may activate the pump 618 and adjust the three-way valve 608 simultaneously to draw two-phase fluid from the external cooler 604 to the server chassis.

Further, controller 614 may activate pump 606 and/or pump 612 based on the fluid level of container 630, to increase flow of the two-phase fluid through the components.

Figure 7:
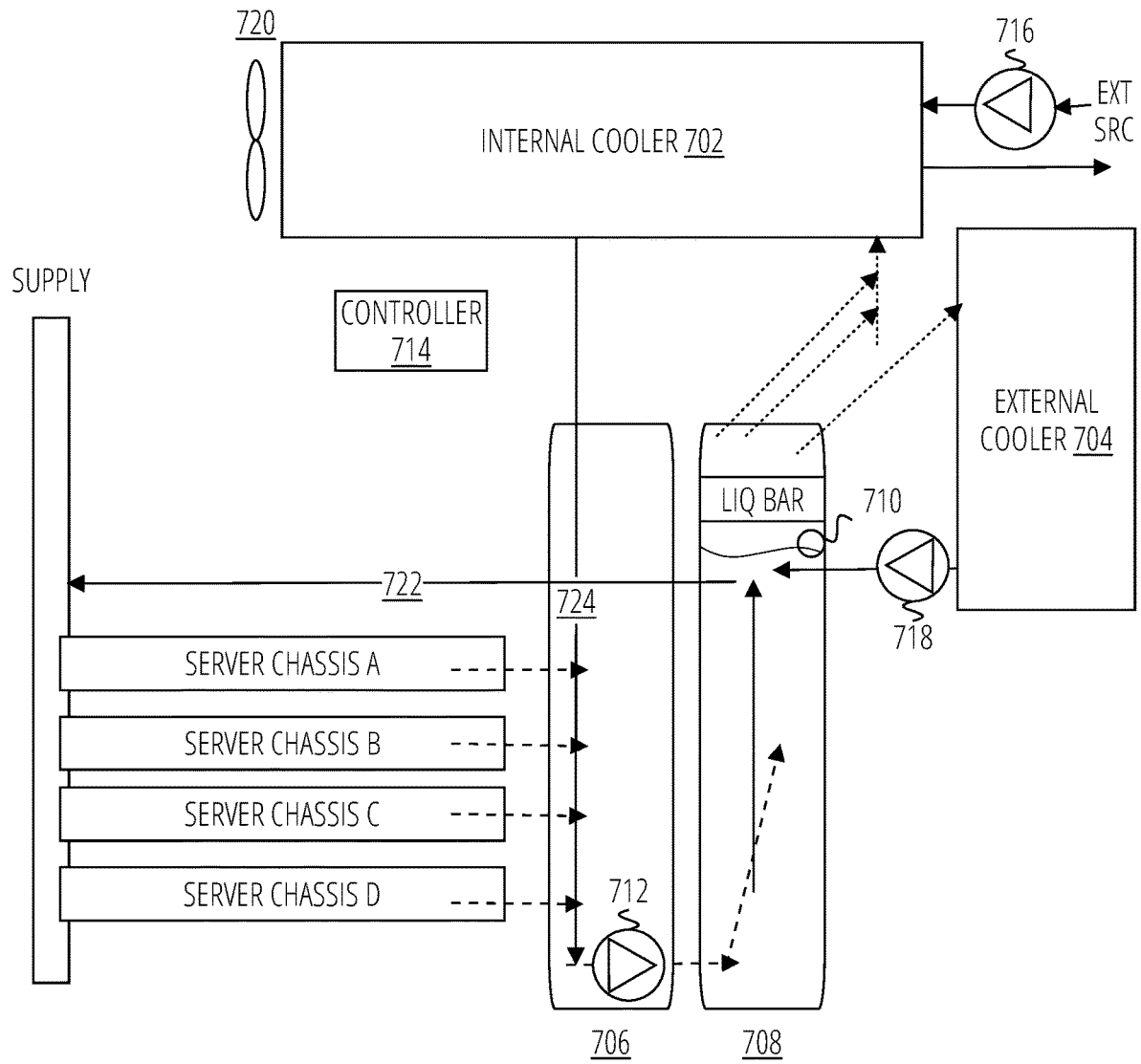
FIG. 7 shows an example of a controller for a cooling system using a mixed fluid pump, in accordance with some embodiments.

FIG. 7 shows an example of cooling system with a controller 714 and a mixed fluid pump 712, in accordance with some embodiments. The controller 714 may monitor one or more sensors 710 to determine the fluid level within the one or more separation containers (e.g., container 708). A mixed fluid pump 712 may be disposed within fluid lines 724 to increase fluid flow from a first separation container 706 to a second separation container 708. The fluid lines 724 may receive and carry both the liquid phase (from internal cooler 702) and mixed phase fluid (from the plurality of server chassis). The fluid may be separated in separation container 708 to vapor and liquid, as described in other sections. An output 722 may carry fluid (in liquid form) out of the separation container 708 to the plurality of server chassis. In this example, separation container 708 does not include a three-way valve. The fluid may be circulated passively (e.g., without pumps) through the thermosiphon-based loops, using natural convection and conduction. When the thermal load increases, controller 714 may activate the components (e.g., fan 720, pumps 706, 708, and/or 716) accordingly.

For example, the pump 712 and pump 718 may be activated and deactivated by controller 714 based on the sensed fluid level in separation container 708. The threshold for turning the pumps on or off may be a level that optimizes the liquid input flow from external cooler 704 and the vapor extraction within the second separation container 708 (e.g., to maintain an equilibrium). In addition, the flow of the thermosiphon loop liquid through internal cooler 702 may also be optimized.

Although not shown in each example, a server rack can, in some embodiments, include various other supporting components. For example, a server rack can include a cooling distribution unit (CDU) and/or a rack management unit (RMU). The server chassis can also be referred to as a server blade that can be inserted into an array of server slots respectively from frontend or backend of the server rack. A server rack can be either open to the environment or partially contained by a rack container. The server rack can include one or more cooling fans that can generate airflow from a frontend to a backend of the server rack. In some embodiments, a server rack may include a cooling fan for each server chassis. The cooling fans may be mounted on each server chassis to generate airflow through the server chassis. In some embodiments, the CDU can include a heat exchanger, liquid pump, a pump controller, a fluid reservoir, a power supply, sensors and more. The CDU's heat exchanger may be a liquid-to-liquid heat exchanger that includes a first loop with inlet and outlet ports having a first pair of liquid connectors coupled to external liquid supply/return lines to form a primary loop. The liquid supply/return lines may be fluidly connected to a set of room manifolds, which may be coupled to an external heat removal system, or external cooling loop. In addition, the heat exchanger may further include a second loop with two ports having a second pair of liquid connectors coupled to the fluid manifold to form a secondary loop that fluidly supplies and returns fluid between one or more server chassis and the CDU.

Each of the server chassis may house one or more servers which may include one or more components such as, for example, central processing units or CPUs, graphical processing units (GPUs), memory, and/or storage devices. Each component may perform data processing tasks, where the component may include software installed in a storage device, loaded into the memory, and executed by one or more processors to perform the data processing tasks. At least some of these components may be attached to the bottom of any of the cold plates as described above. A server may include a host server (referred to as a host node) coupled to one or more compute servers (also referred to as computing nodes, such as CPU server and GPU server). The host server (having one or more CPUs) typically interfaces with clients over a network (e.g., Internet) to receive a request for a particular service such as storage services (e.g., cloud-based storage services such as backup and/or restoration), executing an application to perform certain operations (e.g., image processing, deep data learning algorithms or modeling, etc., as a part of a software-as-a-service or SaaS platform). In response to the request, the host server distributes the tasks to one or more of the performance computing nodes or compute servers (having one or more GPUs) managed by the host server. The performance compute servers perform the actual tasks, which may generate heat during the operations.

A server rack may further include an optional RMU configured to provide and manage power supplied to servers, fan modules, and the CDU. The RMU may be coupled to a power supply unit to manage the power consumption of the power supply unit. The power supply unit may include the necessary circuitry (e.g., an alternating current (AC) to direct current (DC) or DC to DC power converter, backup battery, transformer, or regulator, etc.,) to provide power to the rest of the components of the server rack. Aspects of the cooling distribution system can be flexible and deployable in different system architectures; for example, a server rack may be deployed with a localized pumping system (e.g., a closed system architecture) or central pumping system (e.g., an open system architecture).

Some embodiments may include a non-transitory machine-readable medium (such as microelectronic memory) having stored thereon instructions, which program one or more data processing components (generically referred to here as a "processor") to perform operations described herein. In some embodiments, some of these operations might be performed by specific hardware components that contain hardwired logic. Those operations might alternatively be performed by any combination of programmed data processing components and fixed hardwired circuit components.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A cooling system for a server rack, comprising:
an internal cooler comprising an input to receive a fluid in vapor form, an output to deliver the fluid in liquid form to a plurality of server chassis within the server rack, and a liquid cooling loop that is fluidly isolated from and thermally coupled to the fluid in the internal cooler, wherein the liquid cooling loop is coupled to a liquid pump; and
a separation container, including a first separation container and a second separation container, wherein
the first separation container comprises an input that directly receives the fluid in the liquid form from the internal cooler in the liquid form, and a plurality of second inputs that are each fluidly connected to a respective output of the plurality of server chassis to receive the fluid in a mix of the liquid form and the vapor form, and
the second separation container comprises a first input that is fluidly connected to an external cooler to receive the fluid in the liquid form, a first output that is fluidly connected to the external cooler to provide the fluid to the external cooler in the vapor form, a second output that is fluidly connected to the input of the internal cooler to provide the fluid in the vapor form to the internal cooler, and a valve that is fluidly arranged in the separation container, the valve being fluidly coupled to the external cooler through the first input, to the mix of the fluid of the liquid form and the vapor form that is inside the second separation container, and to the plurality of server chassis within the server rack,
wherein a fluid line between the first separation container and the second separation container delivers the mix of the fluid in the liquid form and the vapor form from the first separation container to the second separation container; and
a controller configured to control the valve to
supply the fluid to the plurality of server chassis with the fluid only when received from the external cooler in response to a sensed level of the fluid within the second separation container being below a threshold,
supply the fluid to the plurality of server chassis with only the mix of the fluid in the liquid form and the vapor form from inside the second separation container in response to the sensed level of the fluid within the second separation container being at or above the threshold, and
control the liquid pump to increase flow of a cooling liquid through the cooling loop of the internal cooler, in response to the sensed level of the fluid in the second separation container being below the threshold, which cools the fluid in the internal cooler to the liquid form which flows from the internal cooler directly to the first separation container.

2. The cooling system of claim 1, further comprising one or more pumps arranged to increase flow of the fluid through the plurality of server chassis.

3. The cooling system of claim 1, wherein each server chassis comprises a server node.

4. The cooling system of claim 1, wherein each server chassis comprises a cold plate.

5. The cooling system of claim 1, wherein the
first separation container includes fluid lines arranged to receive the fluid through the plurality of second inputs from the plurality of server chassis; and
the second separation container includes the first input that is fluidly connected to receive the fluid from the external cooler, the first output that provides the fluid to the external cooler, and a fluid line connected to the output of the internal cooler.

6. The cooling system of claim 1, wherein the output of the internal cooler is connected to respective inputs of the plurality of server chassis, and wherein
the first separation container includes the plurality of second inputs from the plurality of server chassis and a fluid line with a mixed fluid pump arranged to increase flow of the fluid from the first separation container; and
the second separation container includes the first input that is fluidly connected to receive the fluid from the external cooler, the first output that provides the fluid to the external cooler.

7. The cooling system of claim 1, wherein the external cooler is external to the server rack and the valve is a three-way valve that is enclosed in the second separation container.

8. The cooling system of claim 1, wherein the controller is further configured to control a liquid pump of the internal cooler that increases flow of a cooling liquid through the internal cooler that extracts thermal energy from the fluid in the internal cooler, in response to the sensed level of the fluid in the separation container being below the threshold.

9. The cooling system of claim 1, wherein the controller is further configured to control a fan to extract thermal energy from the fluid in the internal cooler, in response to the sensed level of the fluid in the separation container being below the threshold.

10. The cooling system of claim 1, wherein the controller is further configured to control a third pump arranged to increase flow of the fluid from the external cooler to the separation container in response to the sensed level of the fluid in the separation container being below the threshold.

11. The cooling system of claim 1, further comprising a third output that is fluidly connected to the plurality of server chassis to provide the fluid in the liquid form to the plurality of server chassis.

12. A server rack, comprising:
a plurality of server chassis;
an internal cooler comprising an input to receive a fluid in vapor form, an output to deliver the fluid in liquid form to the plurality of server chassis within the server rack, and a liquid cooling loop that is fluidly isolated from and thermally coupled to the fluid in the internal cooler, wherein the liquid cooling loop is coupled to a liquid pump;
a separation container, including a first separation container and a second separation container, wherein
the first separation container comprises an input that directly receives the fluid in liquid form from the internal cooler in the liquid form, and a plurality of second inputs that are each fluidly connected to a respective output of the plurality of server chassis to receive the fluid in a mix of the liquid form and the vapor form, and
the second separation container comprises a first input that is fluidly connected to an external cooler to receive the fluid in the liquid form, a first output that is fluidly connected to the external cooler to provide the fluid to the external cooler in the vapor form, a second output that is fluidly connected to the input of the internal cooler to provide the fluid in the vapor form to the internal cooler, and a valve that is fluidly arranged in the separation container, the valve being fluidly coupled to the external cooler through the first input, to the mix of the fluid of the liquid form and the vapor form that is inside the second separation container, and to the plurality of server chassis within the server rack,
wherein a fluid line between the first separation container and the second separation container delivers the mix of the fluid in the liquid form and the vapor form from the first separation container to the second separation container; and
a controller configured to control the valve to
supply the fluid to the plurality of server chassis with the fluid only when received from the external cooler in response to a sensed level of the fluid within the second separation container being below a threshold,
supply the fluid to the plurality of server chassis with only the mix of the fluid in the liquid form and the vapor form from inside the second separation container in response to the sensed level of the fluid within the second separation container being at or above the threshold, and
control the liquid pump to increase flow of a cooling liquid through the cooling loop of the internal cooler, in response to the sensed level of the fluid in the second separation container being below the threshold, which cools the fluid in the internal cooler to the liquid form which flows from the internal cooler directly to the first separation container.

13. The server rack of claim 12, further comprising one or more pumps arranged to increase flow of the fluid through the plurality of server chassis.

14. The server rack of claim 12, wherein each server chassis comprises a server node.

15. The server rack of claim 12, wherein each server chassis comprises a cold plate.

16. The server rack of claim 12, wherein
first separation container includes fluid lines arranged to receive the fluid through the plurality of second inputs from the plurality of server chassis; and
the second separation container includes the first input that is fluidly connected to receive the fluid from the external cooler, the first output that provides the fluid to the external cooler, and a fluid line connected to the output of the internal cooler.

17. The server rack of claim 12, wherein the output of the internal cooler is connected to respective inputs of the plurality of server chassis, and wherein the
first separation container includes the plurality of second inputs from the plurality of server chassis and a fluid line with a mixed fluid pump arranged to increase flow of the fluid from the first separation container; and
the second separation container includes the first input that is fluidly connected to receive the fluid from the external cooler, the first output that provides the fluid to the external cooler.

18. The server rack of claim 12, wherein the external cooler is external to the server rack and the valve is a three-way valve that is enclosed in the second separation container.

19. The server rack of claim 12, wherein the controller is further configured to control a liquid pump of the internal cooler that increases flow of a cooling liquid through the internal cooler that extracts thermal energy from the fluid in the internal cooler, in response to the sensed level of the fluid in the separation container being below the threshold.

20. The server rack of claim 12, wherein the controller is further configured to control a fan to extract thermal energy from the fluid in the internal cooler, in response to the sensed level of the fluid in the separation container being below the threshold.

* * * * *